CAPACITOR DIELECTRIC COMPOSITIONS AND CAPACITORS MADE THEREFROM
Filed Dec. 5, 1966
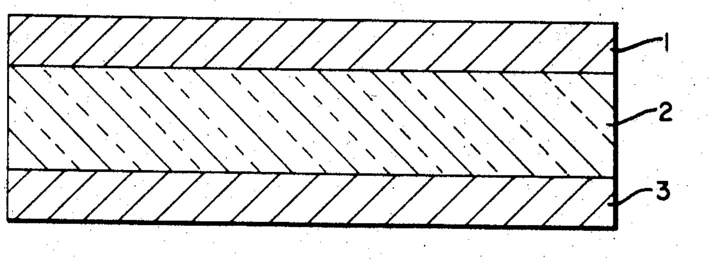
INVENTOR
LEWIS C. HOFFMAN
BY John J. Klocko III
ATTORNEY

United States Patent Office 3,437,892

Patented Apr. 8, 1969

3,437,892

CAPACITOR DIELECTRIC COMPOSITIONS AND CAPACITORS MADE THEREFROM

Lewis C. Hoffman, Wilmington, Del., assignor to E. I. du Pont de Nemours and Company, Wilmington, Del., a corporation of Delaware Filed Dec. 5, 1966, Ser. No. 598,906
Int. Cl. H01g *1/01*
U.S. Cl. 317—258 7 Claims

ABSTRACT OF THE DISCLOSURE

An electrical capacitor with dielectric compositions which are composed of finely divided glass powders dispersed in an inert vehicle. The particular glass powders are characterized by low electrical loss properties and are composed of critical proportionate amounts of $SiO_2$, $B_2O_3$, $Al_2O_3$, $ZrO_2$, ZnO, PbO and alkali metal oxides.

BACKGROUND OF THE INVENTION

Capacitors, devices that store electrical energy, comprise conducting plates separated by thin layers of dielectric. Vitreous compositions or glasses have been utilized as the dielectric elements in the fabrication of electrical capacitors. When utilized for such purposes, vitreous compositions or glasses possess outstanding advantages as regard to strength, ease of fabrication, stability or constancy of the dimensions and relatively low electrical losses when subjected to direct current electrical potentials. However, when these previously known vitreous compositions are subjected to alternating electrical potentials of high frequency, such as those occurring in radio circuits, television circuits, and similar apparatus, dielectrical losses occur which result in reducing the efficiency of the entire circuit. In many cases the eletrical losses introduced by the use of these vitreous compositions are so great that the glass cannot be used for the insulators, supports, or for the dielectric layers in electrical capacitors.

The electrical losses of the capacitors may be expressed either in terms of power factor or Q-value. The power factor is defined as the sine of the dielectric loss angle, and Q-value is the cotangent of this angle (the angle between 90 degrees and the current vector leading the voltage). As the Q-values for low-loss dielectrics lie in the range of 300 to 1,000, the Q-value is a convenient integral index figure, the increase of which denotes an improvement in electrical merit of a capacitor. The higher the Q-value, the more narrow is the oscillator controlled frequency when the capacitor is the load. Another way of describing Q-value is, the higher the Q-value, the finer is the tuning band (low distortion). Of course, a fine tuning band is desirable since less distortion permits a finer sound and/or picture in a radio or television. Thus, a high Q-value is desirable in capacitors which are presently used in the radio and television field. High Q-value dielectrics are also used as insulators in circuits where high losses and feedback between parts of the circuit are undesirable.

In an effort to find a more satisfactory material which could be used as the dielectric composition, fused quartz has sometimes been used to replace the vitreous compositions or glasses. Quartz possesses a much higher electrical efficiency, more particularly a higher Q-value, than most lower-melting glasses and vitreous compositions previously available. The usefulness of fused quartz is offset, however, by its extremely high melting point and its difficulty in being processed into film-form.

Thus, there is a continuing need, especially in the hybrid printed electronic circuit fields of radio and television, for capacitors and capacitor dielectric compositions which have low melting points in the range of most of the usual metalizing compositions, and that are characterized by lower dielectric losses and higher Q-values.

SUMMARY OF THE INVENTION

This invention relates to highly useful capacitor dielectric compositions which can be printed and fired to produce highly efficient capacitors having low dielectric losses and high Q-values. Briefly, the invention is accomplished by utilizing a particular glass dielectric which is composed of various metal oxides in critical proportions.

Accordingly, the capacitor dielectric compositions of the present invention comprise a finely divided glass powder dispersed in an inert vehicle. The glass compositions, characterized by exceptionally high Q-values and other desirable electrical properties, comprise ZnO, PbO, $SiO_2$, $B_2O_3$, $Al_2O_3$ and $ZrO_2$. Small amounts of BaO, $K_2O$, $Na_2O$ and $Li_2O$ may also be included. It has been found that low electric loss capacitors can be made by screen printing and firing the abovementioned glass compositions as the dielectric between layers of conventional metalizing conductor compositions. The glass of the dielectric composition has sufficient tolerance for the components of the metallizing composition so that the capacitors formed after firing possess low electrical loss properties and high Q-values. Additionally, the above-mentioned glass compositions may be used as the glass component of the inorganic binder in electrode metalizing compositions.

DESCRIPTION OF THE PREFERRED EMBODIMENTS

The particular glass utilized in the dielectric compositions of this invention exploits various ingredients in a critical combination of proportions such that the compositions may be readily fired to provide capacitors having low dielectric losses and high Q-values. More particularly, these ingredients must be present within the composition ranges of weight percentages defined below in Table I.

TABLE I

| | Weight percent |
|---|---|
| $SiO_2$ | 13–25 |
| $B_2O_3$ | 15–29 |
| $Al_2O_3$ | 5–10 |
| $ZrO_2$ | 2–4 |
| ZnO | 22–27 |
| PbO | 15–26 |
| $Na_2O$ | 0–0.3 |
| BaO | 0–5 |
| $Li_2O$ | 0–0.2 |
| $K_2O$ | 0–0.2 |

It has been found that the combined use of the abovelisted oxides in glass compositions imparts excellent electrical properties, including high Q-values, to printed and fired dielectrics, electrodes and capacitors made therefrom. The utilization of the specified proportions of all the metal oxides in relation to each other imparts the desired electrical properties and melting points to the dielectrics. In particular, by using at least 22%, but not more than 27% of ZnO, drastically lower dielectric losses and high Q-values are produced in the fired dielectrics. If less than 22% ZnO is used, the dielectric has an undesirably low Q-value and poor electrical properties; if more than 27% ZnO is used, the coalescing (firing) temperature becomes too high. Therefore, the most important factor of this invention is the presence of 22–27% ZnO in combination with the other metallic oxides. It is also important to have 15–26% PbO present to impart proper firing temperature and thermal expansion without sacrificing a loss in electrical properties or lowering the Q-value. Above 26% PbO, there is a loss in electrical properties and a low Q-value.

The capacitor dielectric compositions of this invention are produced by melting any suitable batch composition yielding the prescribed metallic oxides and proportions thereof. In Table II there are listed several batch compositions which, when melted, will result in vitreous glass compositions falling within the prescribed weight percentage ranges of this invention. In practicing the invention, the batch composition to be utilized is first prepared and then melted to yield a substantially homogeneous fluid glass. The temperature maintained during melting is not critical but is usually within the range of 1,100 to 1,400° C. in order that rapid homogenization of the melt may be obtained. A temperature of about 1,250° C. is preferred.

TABLE II.—BATCH COMPOSITIONS, WT. PERCENT

| | 1 | 2 | 3 | 4 | 5 | 6 | 7 | 8 | 9 |
|---|---|---|---|---|---|---|---|---|---|
| $SiO_3$, flint | 16.5 | 16.0 | 15.8 | 21.4 | 18.9 | 16.0 | 10.8 | 16.4 | 16.5 |
| $H_3BO_3$, boric acid | 29.8 | 36.1 | 35.6 | 23.2 | 30.6 | 35.7 | 40.0 | 32.6 | 29.9 |
| $Al(OH)_3$, aluminum hydrate | 9.8 | 9.5 | 9.4 | 10.2 | 9.8 | 9.6 | 11.5 | 7.4 | 9.8 |
| $ZrO_3$, opax | 1.8 | 1.7 | 1.7 | 1.8 | 2.6 | 1.7 | 1.6 | 3.3 | 1.8 |
| ZnO, zinc oxide | 20.3 | 19.6 | 19.4 | 20.9 | 20.0 | 19.7 | 19.0 | 18.5 | 22.8 |
| PbO, litharge | 21.4 | 16.7 | 12.5 | 22.1 | 17.1 | 17.3 | 16.2 | 21.3 | 18.9 |
| $Na_3CO_3$, soda ash | 0.4 | 0.4 | 0.4 | 0.4 | 0.3 | | 0.2 | 0.4 | 0.3 |
| $BaCO_3$, barium carbonate | | | 5.2 | | | | | | |
| $Li_2CO_3$, lithium carbonate | | | | | 0.4 | | 0.4 | | |
| $K_3CO_3$, dried potash carbonate | | | | | 0.3 | | 0.2 | | |

After a homogeneous fluid product is secured, it may be further processed or fabricated by any procedure well known in the art. It may, for example, be drawn or blown or pressed into the form of desired objects. Moreover, the homogeneous glass fluid may be poured into water or other liquid to form a frit which may then be subsequently ground or comminuted to a powder. The product in this powdered form may then be utilized, as by firing, in order to sinter or fuse it into any massive form or any desired shape.

In practicing the invention, batch mixtures given in Table II, or any other suitable batch compositions, may be employed in producing the glass compositions of Table III which may then be utilized to produce capacitor dielectrics having high electrical efficiency and high Q-values. These dielectrics may vary in nature according to the particular choice of ingredients and may be characterized in properties such as fluidity, softening point, stability against devitrification and similar properties. It is possible to depart somewhat from the specific examples tabulated provided that compositions having the constituents present within the weight percentage ranges given are utilized. However, for highest Q electrical efficiency, it has been found desirable to utilize one or more of the alkali metal oxides ($Na_2O$, $Li_2O$ and $K_2O$) together in the composition. Of course, as previously discussed, it is necessary to have the required amounts of ZnO, PbO, $SiO_2$, $B_2O_3$, $Al_2O_3$ and $ZrO_2$ present.

The invention is illustrated by the following examples. In the examples and elsewhere in the specification all parts, ratios and percentages of materials or components are by weight.

Various glass compositions (1–9) were prepared in frit form by melting the respective batch compositions (1–9) of Table II and pouring the homogeneous melt into water.

The fritted products were then ground to fine powders of particle size ranging from 0.1 to 20 microns. These fine glass powders were dispersed in an inert vehicle consisting of 8% ethyl cellulose and 92% beta-terpineol to produce dielectric compositions. These compositions were then fabricated into electrical capacitors in a conventional manner, such as is disclosed in U.S. Patent 2,398,176.

The capacitors were prepared by firing a 3.1 mm. square electrode print of a platinum-gold metallizing composition on a 96% alumina substrate at 750° C. for 10 minutes. The prefired bottom electrode was then covered with a print of the above-mentioned finely ground glass dielectric compositions from Table III in an organic vehicle, and then dried. Finally, a third print of the same metalizing composition was superposed on the dielectric print and the assemblage of prints was coalesced (fired) at 750° C. for 10 minutes to form the fired capacitor. Wire leads were soldered to the conductor portion of the capacitor by dipping in Sn-Pb eutectic solder. The capacitance was measured on a General Radio Model 1680 automatic capacitance bridge and the thickness measured by means of a Starrett micrometer dial gage. The dielectric constant was calculated from the dimensions and capacitance of the capacitor.

A typical capacitor is illustrated in the drawing. The capacitor comprises a bottom electrode 3, a dielectric layer 2 and a top electrode 1.

The capacitance change and dissipation factor were measured by a three-terminal shielded cable connection to the units in a properly wired heating/cooling chamber. The Q at 1 MHz and 50 MHz was measured with a Boonton Radio Model 260 Q meter. The temperature at which the dissipation factor rose over 1% was recorded in Table III. The percent changes in capacitance from 25 to −55° C. and from 25 to 140° C. were also measured and recorded.

The platinum-gold metalizing composition, which was in finely divided form (0.1 to 20 microns), consisted of:

| | Percent by weight |
|---|---|
| Gold | 50 |
| Platinum | 15 |
| $Bi_2O_3$ | 12 |
| Inert vehicle (8% ethyl cellulose/92% beta-terpineol) | 15 |
| Glass (63.1% CdO, 16.9% $B_2O_3$, 12.7% $SiO_2$, 7.3% $Na_2O$) | 3 |

TABLE III.—MELTED GLASS COMPOSITIONS, WT. PERCENT

| | 1 | 2 | 3 | 4 | 5 | 6 | 7 | 8 | 9 |
|---|---|---|---|---|---|---|---|---|---|
| $SiO_2$ | 19.8 | 19.8 | 19.8 | 24.8 | 22.8 | 19.8 | 13.8 | 19.8 | 19.8 |
| $B_2O_3$ | 20.1 | 25.1 | 25.1 | 15.1 | 20.8 | 24.8 | 28.8 | 22.1 | 20.1 |
| $Al_2O_3$ | 7.7 | 7.7 | 7.7 | 7.7 | 7.7 | 7.7 | 9.7 | 5.8 | 7.7 |
| $ZrO_2$ | 2.1 | 2.1 | 2.1 | 2.1 | 3.1 | 2.1 | 2.1 | 4.0 | 2.1 |
| ZnO | 24.3 | 24.3 | 24.3 | 24.3 | 24.3 | 24.3 | 24.3 | 22.3 | 27.3 |
| PbO | 25.7 | 20.7 | 15.7 | 25.7 | 20.7 | 31.3 | 20.7 | 25.7 | 22.7 |
| $Na_2O$ | 0.3 | 0.3 | 0.3 | 0.3 | 0.2 | | 0.2 | 0.3 | 0.3 |
| BaO | | | 5.0 | | | | | | |
| $Li_2O$ | | | | | 0.2 | | 0.2 | | |
| $K_2O$ | | | | | 0.2 | | 0.2 | | |
| K, 1 kHz | 8 | 8 | 10 | 13 | 8 | 8 | 10 | 6 | 9 |
| Q, 1 MHz | 484 | 593 | 633 | 802 | 392 | 524 | 320 | 502 | 540 |
| Q, 50 MHz | 182 | 180 | 172 | 240 | 105 | 196 | 204 | 210 | 290 |
| T, ° C. for 1% d.f. at 1 kHz | 110 | 85 | 105 | 90 | 75 | 105 | 80 | 105 | 100 |
| Cap. Change, percent, 25 to −55° C | −1.8 | −2.7 | −2.0 | −3.1 | −4.0 | −1.7 | −3.0 | −2.5 | −2.1 |
| Cap. Change, percent, 25 to 140° C | +7.5 | +8.5 | +10.0 | +10.0 | +12.6 | +8.1 | +10.5 | +9.5 | −9.5 |

The above-tabulated results point out some of the specific capacitor characteristics which are within the scope of this invention. For example, the first recorded property demonstrates that the capacitors of this invention have a desirable low dielectric constant.

The Q-values were measured at two different frequencies (1 megahertz and 50 megahertz) for each capacitor with a Boonton Radio Model 260 Q meter. It was observed that at the standard 1 megahertz frequency, the Q-values desirably ranged from 320 to 800.

The temperature (° C.) at which the dissipation factor (D.F.) rose over 1% at a frequency of 1 kilohertz was measured. The higher such temperature, the more desirable and better is the capacitor. The capacitors of this invention could be heated to 75–110° C. before over 1% electrical loss occurred at 1 kilohertz.

The capacitance change as a function of temperature was also recorded. A small capacitance change is, of course, desired. It can be seen that the capacitance change at two different temperature ranges was small.

Thus, capacitors produced from the capacitor dielectric compositions of this invention have an outstanding combination of electrical properties. In addition to having desirable high Q-values, the present capacitors have low dielectric constants, low dielectric loss (dissipation factor), and possess a small capacitance change per temperature change. These capacitors have new and unexpected properties which have not been disclosed previously.

Additionally, it has been observed that the Q-value is not only a function of the dielectric in the dielectric layer of the capacitor; Q-value is also a function of the percentage of metal and glass in the electrodes. This is demonstrated by Table IV where various electrodes were prepared from different glass/metal mixtures. Capacitors were prepared from these various electrodes with the same dielectrics of the invention used in all cases. The Q-values were determined for each capacitor.

TABLE IV.—EFFECT OF ELECTRODES ON Q OF GLASS COMPOSITION 1 AS DIELECTRIC

| | 1 | 2 | 3 | 4 | 5 | 6 | 7 | 8 | 9 |
|---|---|---|---|---|---|---|---|---|---|
| Glass (A)[1] | 3 | | | 3 | | | 3 | | |
| Glass No. 1[2] | | 15 | 5 | | 15 | 5 | | 15 | 5 |
| Silver | | | | 85 | 85 | 95 | 57 | 57 | 63.4 |
| Palladium | | | | | | | 28 | 28 | 31.6 |
| Gold | 68 | 68 | 75 | | | | | | |
| Platinum | 17 | 17 | 20 | | | | | | |
| $Bi_2O_3$ | 12 | | | 12 | | | 12 | | |
| Q at 1 MHz | 484 | 378 | 805 | 409 | 326 | 1,399 | 491 | 394 | 709 |
| Q at 50 MHz | 182 | 403 | 1,090 | 218 | 714 | 901 | 269 | 702 | 1,712 |

[1] This glass consisted of 63.1% CdO, 16.9% $B_2O_3$, 12.7% $SiO_2$ and 7.3% $Na_2O$.

[2] This is Glass No. 1 from Table III.

It can be readily observed that by using a high Q glass (glass No. 1) in the electrode, a higher Q-value is obtained at higher frequencies than when a low Q glass (glass A) is utilized at the same frequencies. Moreover, by lowering the glass content and raising the metal content of the electrode, a much higher Q is obtained (700–1,700) as shown by electrodes 3, 6 and 9. Therefore, the particular glass used as the inorganic binder in the electrodes also has a pronounced effect on the improvement of electrical properties in the electrodes. Consequently, the electrical properties of capacitors produced from these electrodes are improved.

It can be seen from the tabulated data in Tables III and IV that by using the particular glass compositions of this invention in the dielectric layers and/or in the electrodes of capacitors, a unique combination of properties, including low electric loss and high Q-values, can be obtained.

While the above examples are intended to show the preferred embodiments of this invention, this is in no way intended to limit the scope of this invention. Therefore, in preparing the capacitor dielectric compositions or the electrode metalizing compositions, any inert liquid may be utilized as the vehicle. Water or any one of various organic liquids, with or without thickening and/or stabilizing agents and/or other common additives, may be used. Examples of organic liquids that can be used are the aliphatic alcohols; esters of such alcohols, for example, the acetate and propionates; the terpenes such as pine oil, alpha- and beta-terpineol and the like; and solutions of resins such as the polymethacrylates of lower alcohols, or solutions of ethyl cellulose, and solvents such a pine oil and the monobutyl ether of ethylene glycol monoacetate (butyl-O-$CH_2CH_2$-$OOCH_3$). The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The proportions of inert vehicle:solids (glass, metals, etc.) in the capacitor dielectric compositions and the electrode metalizing compositions may vary considerably depending upon the manner in which the paint or paste is to be applied and the kind of vehicle used. Generally, from 1 to 20 parts by weight of solids (glass, metals, etc.) per part by weight of vehicle will be used to produce a paint or paste of the desired consistency. Preferably, 4 to 10 parts of solids per part of vehicle will be used.

A wide variety of conductive metalizing compositions can be used to form the electrode layers of the present capacitors. While not intending to limit the scope of this invention, the preferred metals are noble metals and particularly gold, silver, platinum and palladium and mixtures thereof. Any of the other conventional conductive metals may also be used.

Any inorganic material which serves to bind the metals to the substrate can be used as the inorganic binder component of the electrode. The inorganic binder can be any of the glass frits employed in capacitor compositions of this general type. The patents to Larsen and Short, U.S. Patent No. 2,822,279 and to Hoffman, U.S. Patent No. 3,207,706 describe some frit compositions which can be employed either alone or in combination with glass wetting agents such as bismuth oxide. Typical frit compositions usable as binders in the electrodes of this invention include lead borate, lead silicate, lead borosilicate, cadmium borate, lead-cadmium borosilicate, zinc borosilicate and sodium-cadmium borosilicate. Of course, it is preferred to use the same glass which is used in the dielectric of this invention as the inorganic binder in the electrode. The proportions of metals and inorganic binder in the electrodes can be 85–99% and 1–15%, respectively.

The screen-printed capacitors of this invention are conveniently prepared by screen stenciling a first conductive layer (referred to as an electrode) onto a ceramic substrate and thereafter sceen stenciling a dielectic composition of this invention thereover, followed by a screen stenciling of a second conductive layer (referred to as a counterelectrode) over the first two layers. It should be noted that each of the two electrodes and the intermediate dielectric layer of the capacitor formed may be fired separately or at the same time, or the dielectric layer may be fired with either of the two electrodes. Capacitors having more than one electrode and more than one counterelectrode can be screen stenciled onto the ceramic substrate as desired. The deposited layers may be fired in any number of firings desired. Connection of the electrodes and counterelectrodes in separate electrically parallel relationship may be achieved by extending the dimensions of the electrodes in a first direction beyond the dimensions of the dielectric layers and extending the dimensions of the counterelectrodes in a second direction beyond the dimensions of the dielectric layers.

By using the teachings of this invention, capacitor dielectric compositions and electrode compositions can be printed and fired to yield highly efficient capacitors having low dielectric losses and high Q-values. The critical combination of ingredients and proportions of this invention produces a unique combination of electrical properties not known in the art.

Since it is obvious that many changes and modifications can be made in the above-described details without departing from the nature and spirit of the invention, it is to be understood that the invention is not to be limited to said details except as set forth in the appended claims.

I claim:

1. A capacitor dielectric composition comprising an inert vehicle having dispersed therein a finely divided glass powder composition consisting essentially of 22–27 weight percent ZnO, 15–26 weight percent PbO, 13–25 weight percent $SiO_2$, 15–29 weight percent $B_2O_3$, 5–10 weight percent $Al_2O_3$, 2–4 weight percent $ZrO_2$, 0–5 weight percent BaO, 0–0.3 weight percent $Na_2O$, 0–0.2 weight percent $K_2O$ and 0–0.2 weight percent $Li_2O$.

2. The composition of claim 1 wherein the glass composition consists essentially of 24.3 weight percent ZnO, 25.7 weight percent PbO, 19.8 weight percent $SiO_2$, 20.1 weight percent $B_2O_3$, 7.7 weight percent $Al_2O_3$, 2.1 weight percent $ZrO_2$, and 0.3 weight percent $Na_2O$.

3. A capacitor comprising at least one electrode and at least one counterelectrode having a layer of fired dielectric composition between the electrodes, said dielectric composition comprising a coalesced glass composition which consists essentially of 22–27 weight percent ZnO, 15–26 weight percent PbO, 13–25 weight percent $SiO_2$, 15–29 weight percent $B_2O_3$ 5–10 weight percent $Al_2O_3$, 2–4 weight percent $ZrO_2$, 0–5 weight percent BaO, 0.0.3 weight percent $Na_2O$, 0–0.2 weight percent $K_2O$ and 0–0.2 weight percent $Li_2O$.

4. The capacitor of claim 3 wherein the glass composition consists essentially of 24.3 weight percent ZnO, 25.7 weight percent PbO, 19.8 weight percent $SiO_2$, 20.1 weight percent $B_2O_3$, 7.7 weight percent $Al_2O_3$, 2.1 weight percent $ZrO_2$ and 0.3 weight percent $Na_2O$.

5. The capacitor of claim 3 wherein the electrode(s) and counterelectrode(s) consists essentially of 85–99% by weight of a finely divided metal and 1–15% by weight of a coalesced glass composition consisting essentially of 22–27 weight percent ZnO, 15–26 weight percent PbO, 13–25 weight percent $SiO_2$, 15–29 weight percent $B_2O_3$, 5–10 weight percent $Al_2O_3$, 2–4 weight percent $ZrO_2$, 0–5 weight percent BaO, 0–0.3 weight percent $Na_2$, 0–0.2 weight percent $K_2O$ and 0–0.2 weight percent $Li_2O$.

6. The capacitor of claim 5 wherein the glass composition of the electrode(s) and counterelectrode(s) consists essentially of 24.3 weight percent ZnO, 25.7 weight percent PbO, 19.8 weight percent $SiO_2$, 20.1 weight percent $B_2O_3$, 7.7 weight percent $Al_2O_3$, 2.1 weight percent $ZrO_2$ 0.3 weight percent $Na_2O$.

7. A capacitor dielectric composition comprising an inert vehicle having dispersed therein a finely divided glass powder composition consisting essentially of 22–27 weight percent ZnO, 15–26 weight percent PbO, 13–25 weight percent $SiO_2$, 15–29 weight percent $B_2O_3$, 5–10 weight percent $Al_2O_3$, 2–4 weight percent $ZrO_2$, 0.001–5 weight percent BaO, 0–0.3 weight percent $Na_2O$, 0–0.2 weight percent $K_2O$ and 0–0.2 weight percent $Li_2O$.

References Cited

UNITED STATES PATENTS 2,425,032 8/1947 Deyrup ............ 106—49

LEWIS H. MYERS, *Primary Examiner.*

ELLIOT GOLDBERG, *Assistant Examiner.*

U.S. Cl. X.R.

106—39, 49, 53, 54; 252—63.2